US012674548B1

(12) United States Patent
Baylor et al.

(10) Patent No.: US 12,674,548 B1
(45) Date of Patent: Jul. 7, 2026

(54) SOLID CONVEYANCE WITH SINGLE PHASE CHANGE METHOD FOR CRYOGENIC EXTRUSION RECIRCULATION

(71) Applicant: UT-Battelle, LLC, Oak Ridge, TN (US)

(72) Inventors: Larry R. Baylor, Oak Ridge, TN (US); Steven J. Meitner, Oak Ridge, TN (US); William D. McGinnis, Oak Ridge, TN (US); Jeffrey R. Ulreich, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 19/345,028

(22) Filed: Sep. 30, 2025

(51) Int. Cl.
*F17C 7/00* (2006.01)
*G21B 1/15* (2006.01)

(52) U.S. Cl.
CPC .......... *F17C 7/00* (2013.01); *F17C 2221/012* (2013.01); *G21B 1/15* (2013.01)

(58) Field of Classification Search
CPC ......... F17C 7/00; F17C 2221/012; G21B 1/15
See application file for complete search history.

(56) References Cited

U.S. PATENT DOCUMENTS 3,378,446 A 4/1968 Whittlesey
3,624,239 A * 11/1971 Fraas ...................... G21B 1/03 976/DIG. 3

(Continued)

FOREIGN PATENT DOCUMENTS

CN 104637550 A 5/2015
CN 115240877 A 10/2022

(Continued)

OTHER PUBLICATIONS

S.J. Mitner et al., R&D Extrudent Developments for the Wendelstein 7-X Continuous Pellet Fueling System, Jun. 2022, IEEE Transactions on Plasma Science, vol. 50, No. 6, pp. 1957-1961 (Year: 2022).*

(Continued)

*Primary Examiner* — Jianying C Atkisson
*Assistant Examiner* — Ibrahim A. Michael Adeniji
(74) *Attorney, Agent, or Firm* — WARNER NORCROSS + JUDD LLP

(57) ABSTRACT

A cryogenic extrusion recirculation system and method are provided. In one embodiment, the system includes a cryogenically-cooled extruder configured to form solid deuterium-tritium pellets and discharge the pellets through an extruder nozzle. Excess solid extrusion discharged from the extruder nozzle is received by a cryogenically-cooled auger, which conveys the excess material into a restrictive section. The excess material consolidates in the restrictive section as a solid fuel plug. A heater section is positioned downstream of the restrictive section and applies energy to the leading portion of the solid fuel plug, converting the leading portion of the solid fuel plug into a gaseous phase. This gaseous phase is then recirculated into the cryogenically-cooled extruder to support continuous pellet formation in a controlled and efficient manner. Other embodiments include one or more cryopumps in lieu of the cryogenically-cooled auger for converting the excess material into a gaseous phase for recirculation.

10 Claims, 9 Drawing Sheets

(56) References Cited

U.S. PATENT DOCUMENTS

| | | | | | |
|---|---|---|---|---|---|
| 3,723,246 | A * | 3/1973 | Lubin | ...................... | G21B 1/19 376/101 |
| 3,762,992 | A | 10/1973 | Hedstrom | | |
| 3,967,215 | A | 6/1976 | Bellak | | |
| 4,136,926 | A | 1/1979 | Sigler | | |
| 4,142,088 | A * | 2/1979 | Hirsch | ..................... | G21B 1/15 376/104 |
| 4,158,598 | A | 6/1979 | Baird | | |
| 4,179,192 | A | 12/1979 | Shafer | | |
| 4,290,848 | A | 9/1981 | Sudan | | |
| 4,304,627 | A | 12/1981 | Lewis | | |
| 4,440,714 | A | 4/1984 | Rose | | |
| 4,569,819 | A | 2/1986 | David | | |
| 4,657,721 | A | 4/1987 | Thomas | | |
| 4,904,441 | A | 2/1990 | Sorensen et al. | | |
| 5,406,594 | A | 4/1995 | Frattolillo et al. | | |
| 6,807,216 | B1 | 10/2004 | Hilliard | | |
| 9,171,646 | B2 | 10/2015 | Moses et al. | | |
| 10,660,192 | B2 | 5/2020 | Campbell et al. | | |
| 2004/0141578 | A1 | 7/2004 | Enfinger | | |
| 2005/0163184 | A1 | 7/2005 | Hilliard | | |
| 2007/0237278 | A1 | 10/2007 | Lamont | | |
| 2008/0063132 | A1 | 3/2008 | Birnbach | | |
| 2009/0000268 | A1 | 1/2009 | Yurash | | |
| 2011/0261919 | A1 | 10/2011 | Sefcik et al. | | |
| 2013/0064340 | A1 | 3/2013 | Latkowski et al. | | |
| 2014/0233687 | A1 | 8/2014 | Jack | | |
| 2014/0286471 | A1 | 9/2014 | Moses et al. | | |
| 2015/0270019 | A1 | 9/2015 | Sekine et al. | | |
| 2019/0198182 | A1 | 6/2019 | Parks | | |
| 2024/0158106 | A1 | 5/2024 | Nakamura et al. | | |
| 2024/0213736 | A1 | 6/2024 | Nakamura et al. | | |
| 2024/0221963 | A1 | 7/2024 | Nakamura et al. | | |
| 2024/0387062 | A1 | 11/2024 | Nakamura et al. | | |
| 2025/0055249 | A1 | 2/2025 | Nakamura et al. | | |

FOREIGN PATENT DOCUMENTS

| | | | | | |
|---|---|---|---|---|---|
| CN | 120565135 | A * | 8/2025 | ............... | G21B 1/15 |
| JP | H0552978 | A | 3/1993 | | |
| JP | 2941370 | B2 | 8/1999 | | |
| RU | 2229749 | C2 | 5/2004 | | |

OTHER PUBLICATIONS

S.J. Meitner, Cryogenic pellet production developments for long-pulse plasma operation, Jan. 2014, AIP Conf. Proc. 1573, pp. 1475-1482 (Year: 2014).*

Baylor et al., “Pellet fueling and control of burning plasmas in ITER”, Nucl. Fusion 47, 443-448 (2007).

Baylor et al., “Polarized fusion and potential in situ tests of fuel polarization survival in a tokamak plasma”, Nucl. Fusion 63, 076009 (30pp) (2023).

Baylor et al., “Issues in Formation of Cryogenic Pellets for Fusion Applications”, Fusion Science and Technology, vol. 77, 728-737 (2021).

Baylor et al., “Tritium Aspects of Fueling and Exhaust Pumping in Magnetic Fusion Energy”, Fusion Science and Technology, vol. 71, 256-260 (2017).

Combs et al., “Pellet-injector technology—brief history and key developments in the last 25 years.” Fusion Science and Technology 73.4 (2018): 493-518.

Combs et al., “Alternative techniques for injecting massive quantities of gas for plasma-disruption mitigation.” IEEE transactions on plasma science 38.3 (2010): 400-405.

Geraud et al., “Status of the JET high frequency pellet injector.” Fusion Engineering and Design 88.6-8 (2013): 1064-1068.

Combs et al., “A technique for producing large dual-layer pellets in support of disruption mitigation experiments.” Fusion Science and Technology 60.2 (2011): 473-479.

Lyttle et al., “Tritium challenges and plans for ITER pellet fueling and disruption mitigation systems.” Fusion Science and Technology 71.3 (2017): 251-255.

Meitner et al., “Initial commissioning test results of the wendelstein 7-x continuous pellet fueling system.” Fusion Science and Technology 79.8 (2023): 1065-1070.

Meitner et al., “Cryogenic pellet production developments for long-pulse plasma operation.” AIP Conference Proceedings. vol. 1573. No. 1. American Institute of Physics, 2014.

Meitner et al., “Design and commissioning of a three-barrel shattered pellet injector for DIII-D disruption mitigation studies.” Fusion Science and Technology 72.3 (2017): 318-323.

Meitner et al., “R&D extruder developments for the wendelstein 7-X continuous pellet fueling system.” IEEE Transactions on Plasma Science 50.6 (2022): 1957-1961.

Zoletnik et al., “Production and launch studies of cryogenic pellets for the ITER disruption mitigation system.” Nuclear Fusion 64.9 (2024): 096033.

* cited by examiner

SOLID CONVEYANCE WITH SINGLE PHASE CHANGE METHOD FOR CRYOGENIC EXTRUSION RECIRCULATION

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to cryogenic fueling systems for deuterium-tritium fusion reactors and other applications.

BACKGROUND OF THE INVENTION

Deuterium-tritium (D-T) fusion reactors rely on the continuous injection of solid cryogenic pellets into a plasma. D-T fuel pellets are typically formed from solid extrusions produced by a cryogenic screw extruder, in which precooled D-T feed gas desublimates or freezes into a solid phase and is compressed into a continuous flowing ribbon. A circular cutter shears the ribbon perpendicularly, producing cylindrical pellets that are injected into a plasma.

While the foregoing approach has enabled progress in plasma fueling, inefficiencies remain. To initiate cutting, the extrusion is increased to a steady rate, and the cutter makes a circular cross section cut from a rectangular ribbon. As a result, a significant amount of excess extrusion is generated that is not directly used in pellet formation. Excess extrusion must be reprocessed through large-scale gas handling and processing systems, which increases pumping requirements and necessitates large tritium inventories. Moreover, the base of the extruder nozzle must remain at extremely low pressures to limit convective heat losses, while the precooler feed gas pressure must be kept above 1.5 bar to sustain adequate flow.

Accordingly, there remains a continued need for a recirculation system and a method that returns excess extrusion to the extruder feed gas without resorting to external processing facilities, particularly a system and a method that can maintain energy efficiency and reliability to support practical, long-duration D-T fusion reactor operation.

SUMMARY OF THE INVENTION

A cryogenic extrusion recirculation system is provided. The cryogenic extrusion recirculation system is implemented as part of a pellet fueling apparatus for D-T fusion reactors. In one embodiment, the cryogenic extrusion recirculation system includes a cryogenically-cooled extruder configured to form solid D-T pellets and discharge them through an extruder nozzle. Excess solid extrusion discharged from the nozzle is received by an auger, which conveys the excess material away from the nozzle. A restrictive section is provided downstream of the auger to consolidate the excess solid extrusion into a solid fuel plug. A heater section is positioned downstream of the restrictive section and applies energy to a leading portion of the fuel plug, converting the leading portion of the fuel plug into a gaseous phase. This gaseous phase is then recirculated into an inlet region of the cryogenically-cooled extruder to support continuous pellet formation in a controlled and efficient manner.

In one embodiment, the heater section is configured to control heating of the leading portion of the solid fuel plug such that the resulting gaseous phase achieves a pressure that matches the inlet pressure of the extruder. In certain embodiments, the heater section raises the gaseous phase to a temperature between 20 K and 80 K. The restrictive section may take the form of a tubular conduit or a tapered conduit, and in some arrangements the restrictive section is disposed along an axis substantially perpendicular to the extrusion axis of the extruder nozzle. Similarly, the auger may convey the excess solid extrusion perpendicularly away from the nozzle and may be magnetically coupled to a motor positioned outside of the fuel-gas boundary. The cryogenically-cooled extruder itself includes a cryogenic cooling jacket extending around an extruder barrel. Similarly, the auger includes a cryogenic cooling jacket. In some embodiments, the gaseous phase is directed into a supply line downstream of a pre-cooler and upstream of the extruder inlet.

In another embodiment, the invention provides a method of operating a cryogenically-cooled system for pellet injection. The method includes extruding a cryogenically-cooled solid phase through an extruder nozzle, separating the extrusion into individual pellets for delivery to a plasma, and receiving excess solid phase at a cryogenically-cooled auger. The auger conveys the excess material to a restriction section, where it is consolidated into a solid fuel plug. The leading portion of the solid fuel plug is heated in a downstream heater section, converting the leading portion of the fuel plug into a gaseous phase, while the remainder of the fuel plug remains in the solid phase. The gaseous phase is recirculated into the inlet region of the cryogenically-cooled extruder to enable continuous pellet production. The method may further include controlling heating such that the gaseous phase matches the inlet pressure of the extruder, heating the gas to between 20 K and 80 K, and introducing the gas into a supply line positioned between a pre-cooler and the extruder. The auger may convey excess solid extrusion perpendicularly away from the extruder nozzle and may be magnetically coupled to a motor located outside the fuel-gas boundary.

In still another embodiment, excess solid extrusion generated during cutting is directed into a dump chamber, where it sublimates. At least one cryopump receives the resulting gaseous hydrogen from the dump chamber and converts the gaseous hydrogen into a solid phase by desublimation. Once the interior of the cryopump is coated or saturated with a solid phase, the corresponding cryopump is regenerated, i.e., warmed to release the trapped gases, then cooled back down to cryogenic temperatures. The released gases are recirculated to the cryogenically cooled extruder, enabling continuous pellet production. The cryopump can include a cryogenically cooled copper mesh that is thermally coupled to a coolant supply line and a coolant return line to maintain the required cryogenic temperatures. Additionally, the cryopump is equipped with a fuel feed valve and a fuel return valve, each being spring-biased in the closed position, to regulate the flow of hydrogen isotopes through the cryopump.

These and other features and advantages of the present invention will become apparent from the following description of the invention, when viewed in accordance with the accompanying drawings and appended claims.

DETAILED DESCRIPTION OF THE CURRENT EMBODIMENT

Figure 1:
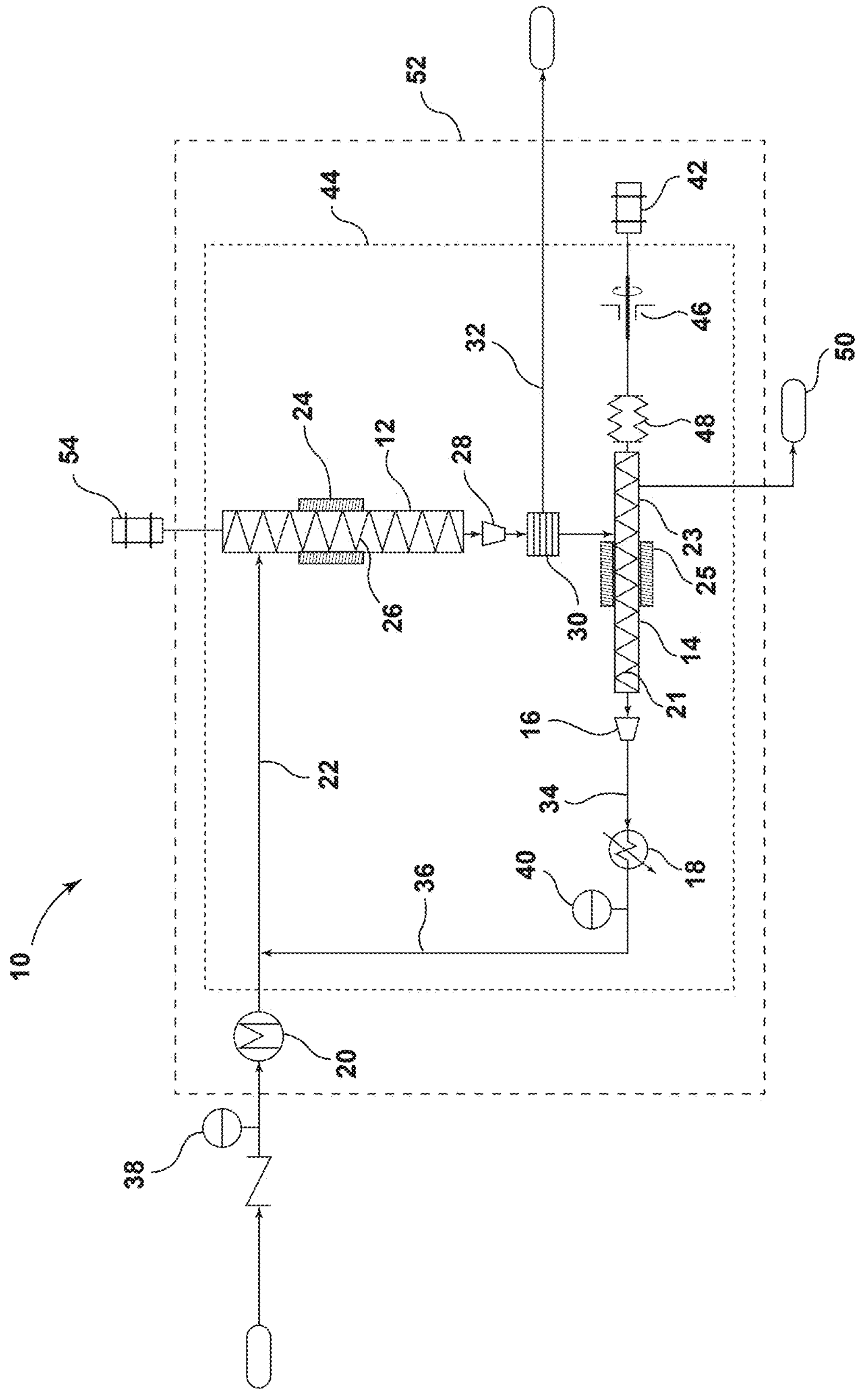
FIG. 1 illustrates a cryogenic extrusion recirculation system in accordance with a first embodiment of the invention.

Referring to FIG. 1, a cryogenic extrusion recirculation system is illustrated. The cryogenic extrusion recirculation system is implemented as part of a pellet fueling apparatus for D-T fusion reactors. As more specifically set forth below, excess solid extrusion is received by a cryogenically-cooled auger, which consolidates the excess solid extrusion into a solid fuel plug comprising cryogenic hydrogen. A heater section applies energy to a leading portion of the solid fuel plug, converting that portion of the solid fuel plug into a gaseous phase. This gaseous phase is then recirculated into an inlet region of a cryogenically-cooled extruder to support continuous pellet formation in a controlled and efficient manner. The cryogenic extrusion recirculation system is discussed in Part I below, and its method of operation is discussed in Part II below. An alternative embodiment is discussed in Part III below.

I. Cryogenic Extrusion Recirculation System

With reference to the embodiment shown in FIG. 1, the cryogenic extrusion recirculation system 10 forms part of a D-T feed apparatus and includes a cryogenically-cooled extruder 12, a cryogenically-cooled auger 14, a restrictive section 16, and a heater section 18. A supply of D-T fuel gas at approximately 300 K and 1.5 bar is introduced into a pre-cooler 20 (upstream of the cryogenically-cooled extruder 12). The pre-cooler 20 reduces the D-T fuel gas temperature to about 30 K to 80 K, while maintaining the supply pressure at or near 1.5 bar. The pre-cooler 20 is in fluid communication with the cryogenically-cooled extruder 12 via a supply line 22. The extruder 12 is surrounded by a cryogenic cooling jacket 24 that maintains operating temperatures in the range of 10 K to 15 K. Within the extruder 12, the D-T fuel gas desublimates onto the interior barrel surfaces and is scraped and compacted by a rotating screw 26. The screw 26 compresses the solidified fuel and discharges it through an extruder nozzle 28, producing a solid extrusion ribbon having a rectangular cross-section. A pellet cutter 30 positioned below the nozzle 28 shears the solid extrusion ribbon to form cylindrical pellets. The cylindrical pellets are delivered into a pellet gun barrel 32, which enables accelerating of the pellets toward a plasma chamber at high speeds for fueling.

Excess solid extrusion then flows into the rotating auger 14 by gravity. The auger 14 defines a longitudinal axis that is perpendicular to a longitudinal axis defined by the extruder 12. The auger 14 includes an auger screw 21, an auger barrel 23, and a cryogenic cooling jacket 25. The cryogenic jacket 25 optionally shares a coolant with the cryogenic jacket 24 of the extruder 12. The auger 14 conveys the excess solid extrusion toward the restriction section 16. The restriction section 16 is illustrated as having a frusto-conical internal diameter in FIG. 1, however the restriction section 16 can include other geometries in other embodiments, including for example a constant inner diameter. The restriction section 16 consolidates the conveyed material into a solid fuel plug in a thermal isolation line 34. The heater section 18 is positioned after the restriction section 16 and is configured to apply thermal energy to the leading portion of the solid fuel plug. In the illustrated embodiment, the heater section 18 operates in the range of 30 K to 40 K. The heating may be provided by a resistive element, an inductive heater, or a laser source. Other heater sections can be implemented in other embodiments.

The resulting gaseous phase is directed through a return line 36 and returned to an upstream portion of the cryogenic extrusion recirculation system 10. In particular, the recirculated gaseous phase enters the supply line 22 (via the return line 36) downstream of the pre-cooler 20 and upstream of the extruder 12. This reintroduction of the gaseous phase allows D-T fuel gas to rejoin the extrusion process without requiring large-scale reprocessing. The recirculation path maintains a pressure differential between the extruder nozzle 28 (about 50 mbar) and the pre-cooler supply line 22 (about 1.5 bar). First and second pressure transducers 38, 40 are positioned along the supply line 22 and the return line 36 to monitor operating conditions. This configuration ensures that the gaseous phase re-enters the extruder under controlled conditions, with pressures and temperatures matched to the requirements for stable extrusion and pellet formation.

As also shown in FIG. 1, the cryogenically-cooled auger 14 is driven by a motor 42 coupled magnetically across a heat shield 44. A magnetic coupling and a rotary feedthrough 46 isolate the motor 42 from the tritium-containing environment. A displacement bellows 48 accommodates axial movement of the auger 14, and an auger dump port 50 is provided for removal of accumulated material when the auger 14 ceases operation. A cryostat housing 52 is functionally a guard vacuum, which surrounds the heat shield 44 to minimize parasitic heat loads and to maintain cryogenic efficiency. A second motor 54 is magnetically coupled to the extruder 14 across the heat shield 44 and is external to the cryostat housing 52.

Referring now to FIGS. 2-5, a pellet fueling apparatus including the cryogenic extrusion recirculation system 10 is illustrated and generally designated 60. The pellet fueling apparatus 60 includes a pre-cooler 20 that reduces the gas temperature prior to entry into the extruder 12 via a supply line 22. The extruder 12 includes a cryogenic cooling jacket, which maintains cryogenic operating conditions suitable for desublimation. The extruder motor 54, mounted above the cryostat housing 52, drives the extruder screw via a magnetic coupling 62 (or other coupling) and bellows 64 to compress and convey solidified fuel through the extruder.

Downstream of the extruder 12, the feed apparatus 60 includes a pellet cutting region. Excess extrusion material flows via gravity to the auger 14, which is disposed perpendicularly to the extrusion axis. The auger 14 conveys the excess extrusion material into a restriction section 16, which consolidates the material into a solid fuel plug. The heater section 18 is positioned downstream of the restriction section 16 and applies thermal energy to convert the leading portion of the fuel plug into a gaseous phase for recirculation, while the remainder of the fuel plug remains in the solid phase, attributable to the poor thermal conductivity of solid hydrogen. An auger exhaust port 66 is also provided to remove material as necessary. The cryogenically-cooled auger 14 is driven by an auger motor 42 mounted externally to the cryostat housing 52, and thrust measurement instrumentation 68 is configured to monitor load conditions during operation.

Figure 3:
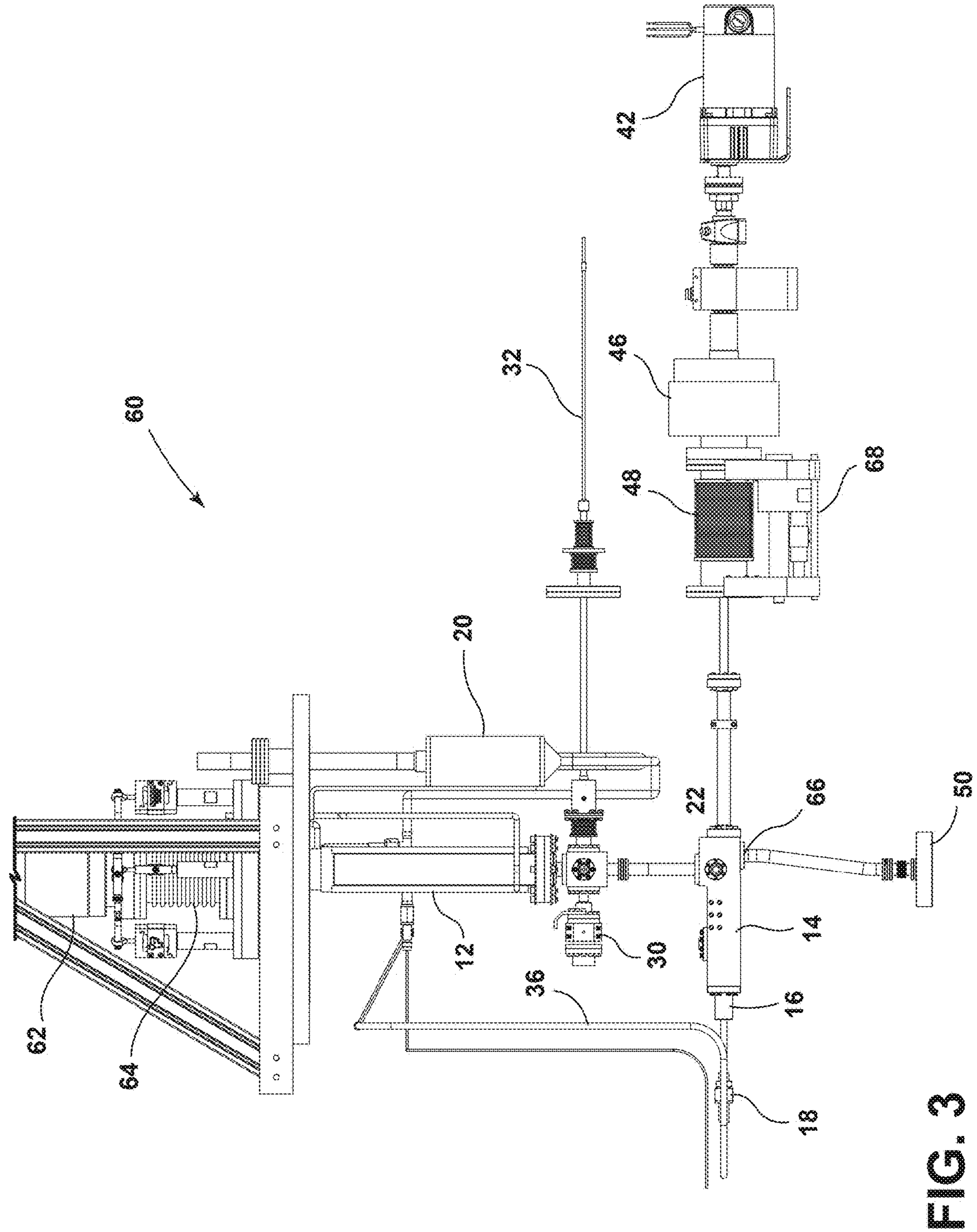
FIG. 3 is a close-up view of the cryogenic extrusion recirculation system of FIG. 2.
Figure 4:
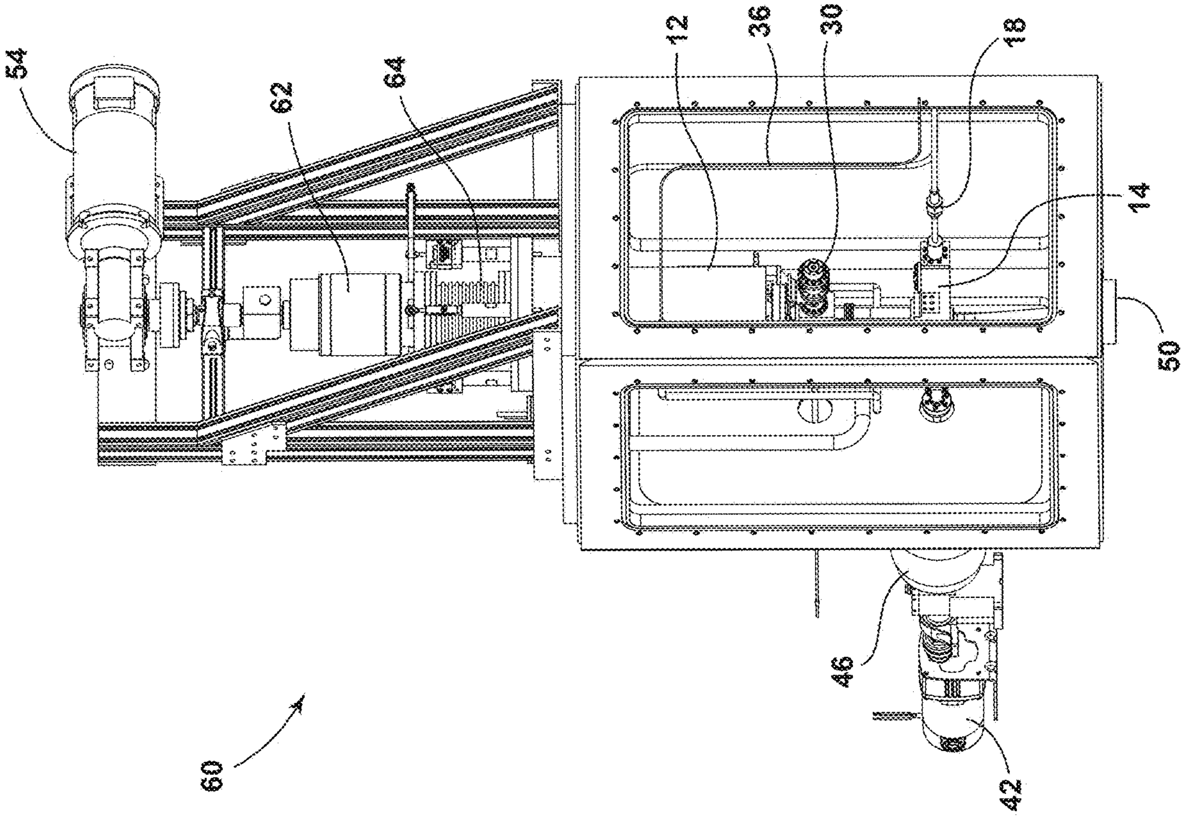
FIG. 4 is a perspective view of the cryogenic extrusion recirculation system of FIG. 2.

FIGS. 3 and 4 include further views of the pellet fueling apparatus 60 to better illustrate the relationship of the precooler 20, extruder 26, and auger 14. Fuel gas enters from above, passes through the precooler 20, and into the extruder 26, where it is cooled to cryogenic temperatures. The extruder 26 delivers the solid ribbon downward, while the auger 14—disposed perpendicular to the nozzle axis—captures excess extrusion and conveys it toward the restriction section 16 and the heater section 18. The auger motor 42 drives the auger shaft, with thrust measurement devices 68 positioned along the auger 14 to provide feedback on operational performance. This view emphasizes the alignment of the extruder and auger subsystems, showing a compact, orthogonal layout that allows the recycling pathway to function without interfering with the primary pellet formation and injection path.

Figure 2:
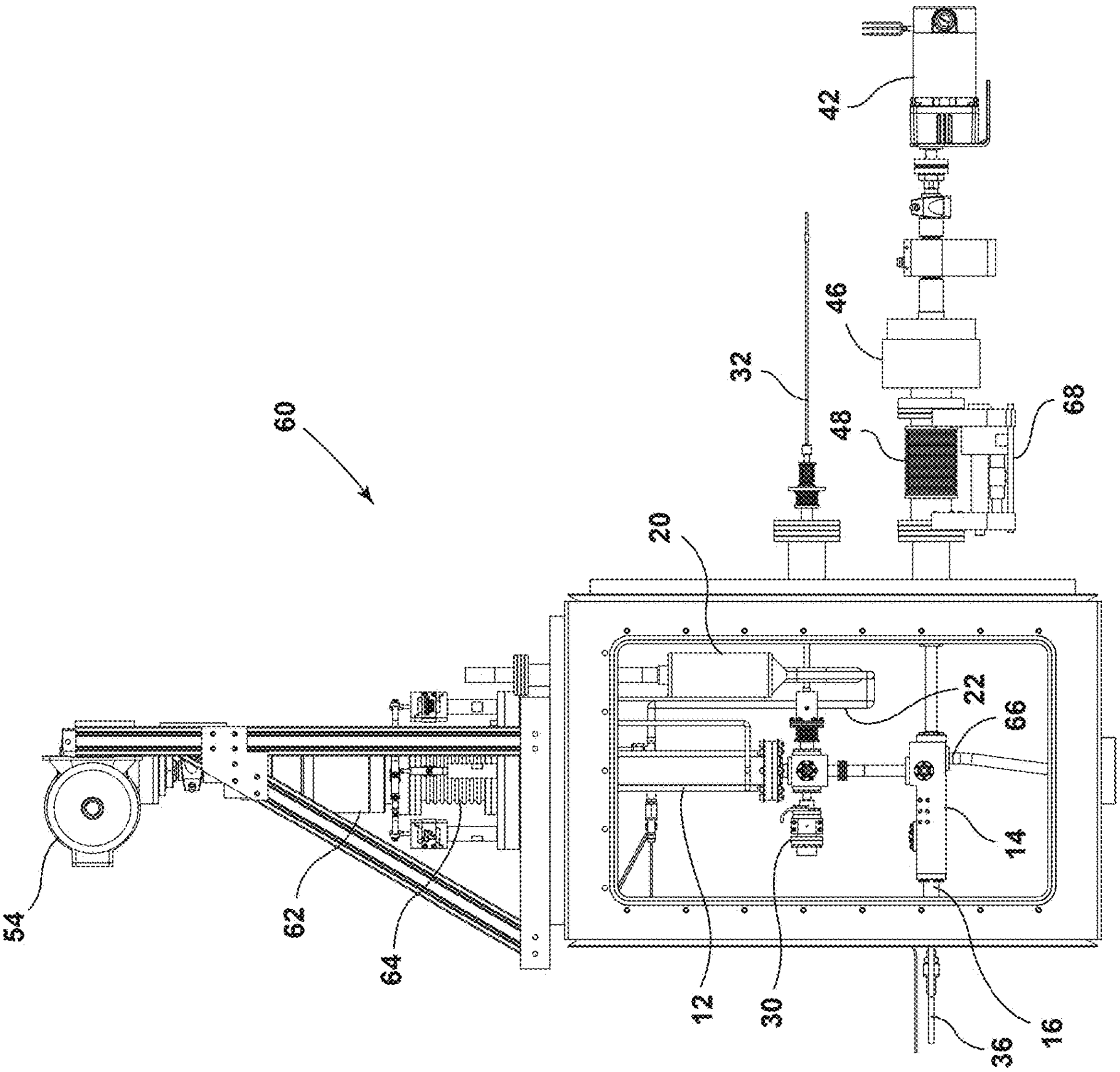
FIG. 2 is a side elevation view of a cryogenic extrusion recirculation system in accordance with the embodiment of FIG. 1.

Together, FIGS. 2 through 4 demonstrate a pellet fueling apparatus 60 that both produces cryogenic D-T pellets for plasma fueling and continuously recycles excess extrusion. The pellet fueling apparatus 60 maintains the low base pressure at the nozzle required to minimize convective thermal losses, while also sustaining the higher inlet pressures needed for adequate feed flow. By converting excess extrusion into a gaseous phase and recirculating it directly into the extruder supply line 22, the feed apparatus 60 avoids the inefficiencies of returning material to a large external gas processing facility. This configuration reduces pumping requirements, minimizes tritium inventory outside of the injector assembly, and enables efficient long-pulse fueling for magnetically confined fusion reactors.

II. Method of Operation

Figure 5:
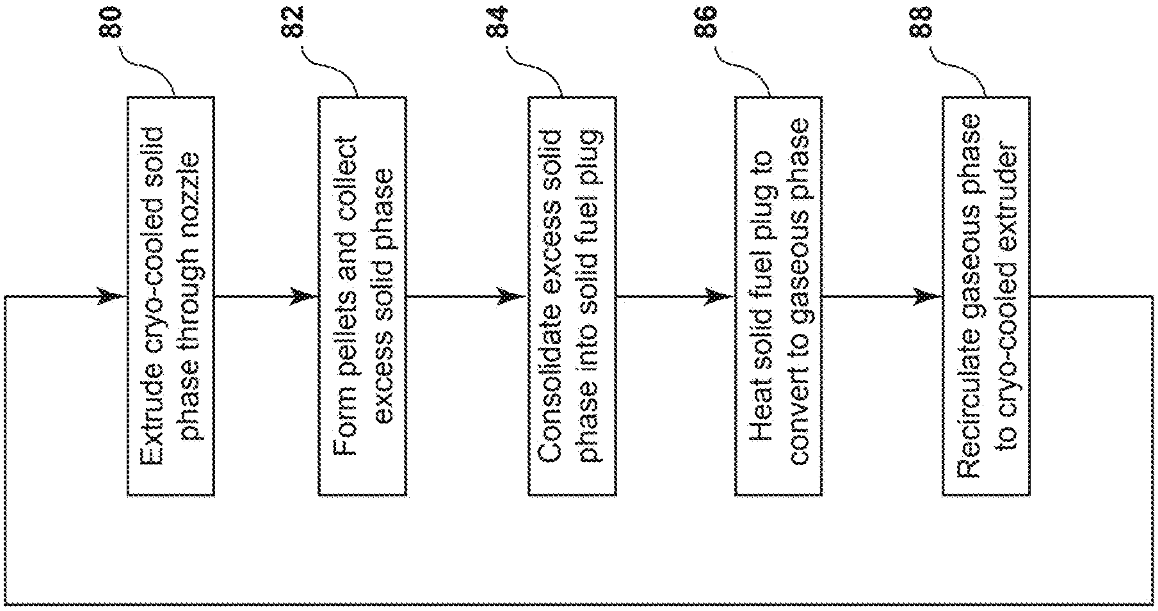
FIG. 5 is a flow chart illustrating a method of operating a cryogenic extrusion recirculation system for D-T pellet injection.

Turning now to FIG. 5, a flow-chart illustrating a method for operating a cryogenically cooled auger system is illustrated. The method begins at step 80, where a cryogenically-cooled solid phase is extruded through an extruder nozzle. At step 82, the solid extrusion is separated into discrete pellets that are directed into a pellet gun barrel for plasma fueling, while excess solid material is simultaneously collected. At step 84, the excess solid extrusion is conveyed by an auger into a restriction section, where the material is consolidated into a solid fuel plug. At step 86, only the leading portion of the solid fuel plug is heated in a heater section positioned downstream of the restriction section, thereby converting the leading portion of the fuel plug into a gaseous phase. The heater section may include a resistive element, an inductive heating unit, or a laser heat source, and is configured to raise the gaseous phase to a temperature in the range of about 20 K to 80 K. The heating may also be controlled such that the resulting gaseous phase is produced at a pressure that matches the inlet pressure of the cryogenically-cooled extruder. Finally, at step 88, the gaseous phase is recirculated into the inlet region of the cryogenically-cooled extruder, thereby supporting continuous pellet production without requiring external reprocessing of the excess fuel. In certain embodiments, the recirculated gas is introduced into a supply line downstream of a pre-cooler and upstream of the extruder inlet. The extruder may be enclosed by a cryogenic jacket extending around the extruder housing to maintain the necessary cryogenic conditions for continuous operation. Together, the steps shown in FIG. 5 illustrate a closed-loop method in which excess extrusion is collected, consolidated, converted, and returned to the extrusion process, enabling efficient long-pulse plasma fueling with minimal fuel loss.

III. Cryopump Recirculation

Figure 6:
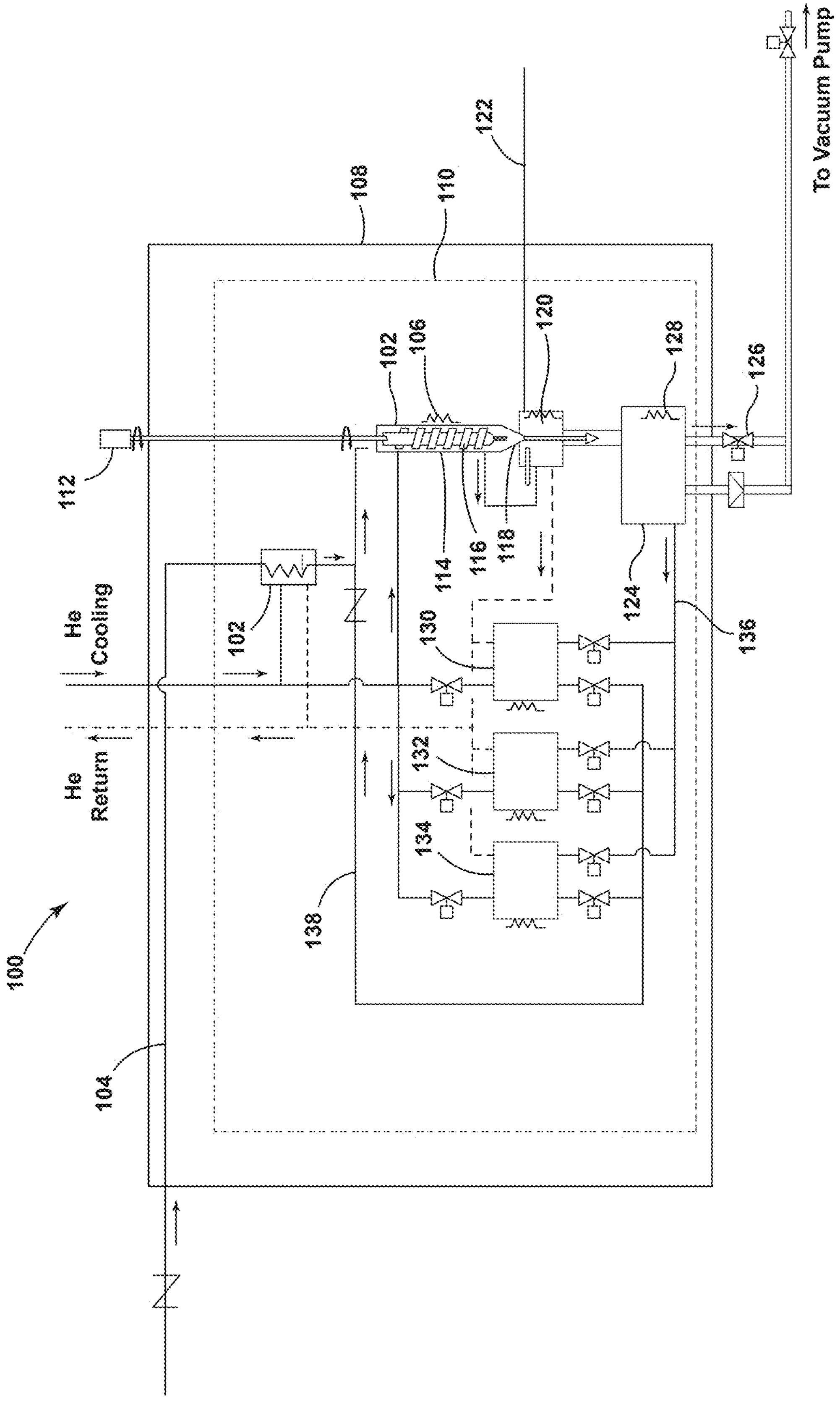
FIG. 6 illustrates a cryogenic extrusion recirculation system in accordance with a second embodiment of the invention.

Referring now to FIG. 6, a pellet fueling apparatus in accordance with a second embodiment is illustrated and generally designated 100. The pellet fueling apparatus 100 of FIG. 6 is similar in structure and in function to the pellet fueling apparatus of FIG. 1, except that the cryogenic auger of FIG. 1 is replaced with a dump chamber and a plurality of cryopumps for collecting and recirculating excess extrusion as a gaseous phase.

More particularly, the pellet fueling apparatus 100 of FIG. 6 includes a pre-cooler 102 that reduces the temperature of a D-T fuel gas to about 30 K to 80 K, while maintaining the supply pressure at or near 1.5 bar. The precooler 102 is supplied with a suitable coolant, for example liquid helium (He-4) or superfluid helium (He-4). The D-T fuel gas is routed to a cryogenically-cooled extruder 102 via a supply line 104. The extruder 12 is surrounded by a cryogenic jacket 106 that maintains operating temperatures in the range of 10 K to 20 K. A guard vacuum (i.e., cryostat) 108 surrounds a heat shield 110 to maintain cryogenic efficiency. The extruder 102 is driven by a motor 112 coupled magnetically across the guard vacuum 108 and the heat shield 110, as with the embodiment of FIG. 1.

Within the cryogenically-cooled extruder 102, the D-T fuel gas desublimates onto the interior surface of the extruder barrel 114 and is scraped and compacted by a rotating screw 116. The screw 116 compresses the solidified fuel and discharges it through an extruder nozzle 118, producing a solid extrusion ribbon having a rectangular cross-section. A pellet gas gun 120 positioned below the nozzle 118 shears the solid extrusion ribbon to form cylindrical pellets. The cylindrical pellets are chambered into a pellet gun barrel 122 and fired toward a plasma chamber for fueling. Excess solid phase falls into a dump chamber 124 positioned below the extruder nozzle 118. The dump chamber 124 is heated by a heat exchanger 128 to sublimate the excess solid phase into a gaseous phase. The dump chamber 124 is coupled to a dump valve 126 to rapidly vent cryogenic gases to a vacuum pump for maintenance or safety.

As also shown in FIG. 6, the dump chamber 124 is in fluid communication with a three cryopumps 130, 132, 134 via a recirculation line 136. Each cryopump creates an ultrahigh vacuum by cooling its internal surfaces to cryogenic temperatures so that gas molecules desublimate onto them. In particular, each cryopump 130, 132, 134 is cooled with the same coolant as is used to cool the extruder 102. Each cryopump 130, 132, 134 includes copper fins or mesh to provide sufficient surface area for collecting a significant amount of gas, such that regeneration is only required on the order of a few minutes. Once the copper fins or mesh are coated or saturated with a solid phase, the corresponding cryopump is regenerated, i.e., warmed to release the trapped gases, then cooled back down to cryogenic temperatures. Each cryopump has a resistive heater to enable it to be regenerated to approximately 40 K temperature. When the cryopumps regenerate, the solid phase sublimates and forms high pressure gas that then flows into the extruder 102 via a return line 138. By converting excess extrusion into a gaseous phase and recirculating it directly to the extruder 102, the fueling apparatus 100 avoids the inefficiencies of returning material to a large external gas processing facility.

Figure 7:
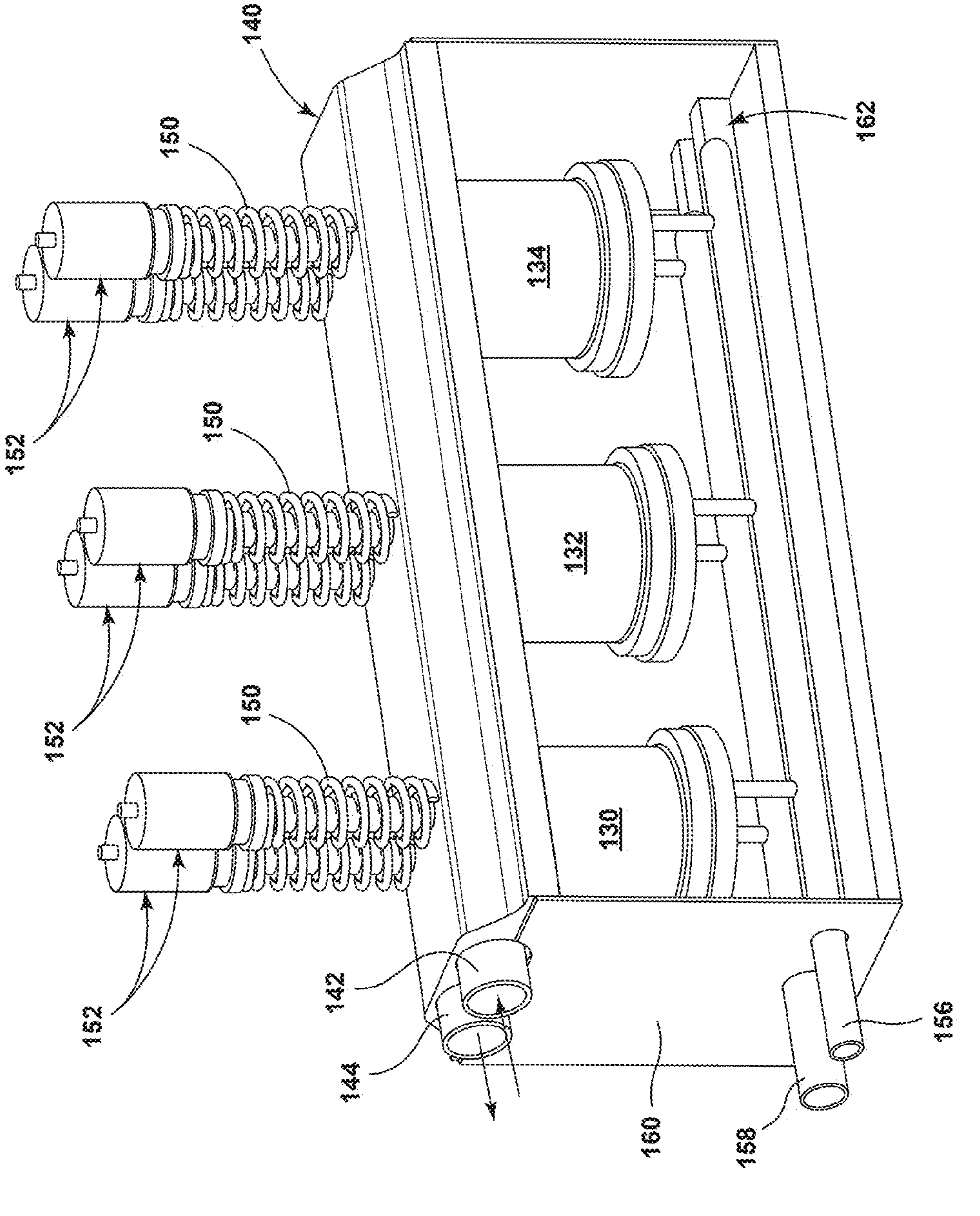
FIG. 7 illustrates a cryogenic manifold that houses three cryopumps for use with the embodiment of FIG. 6.
Figure 8:
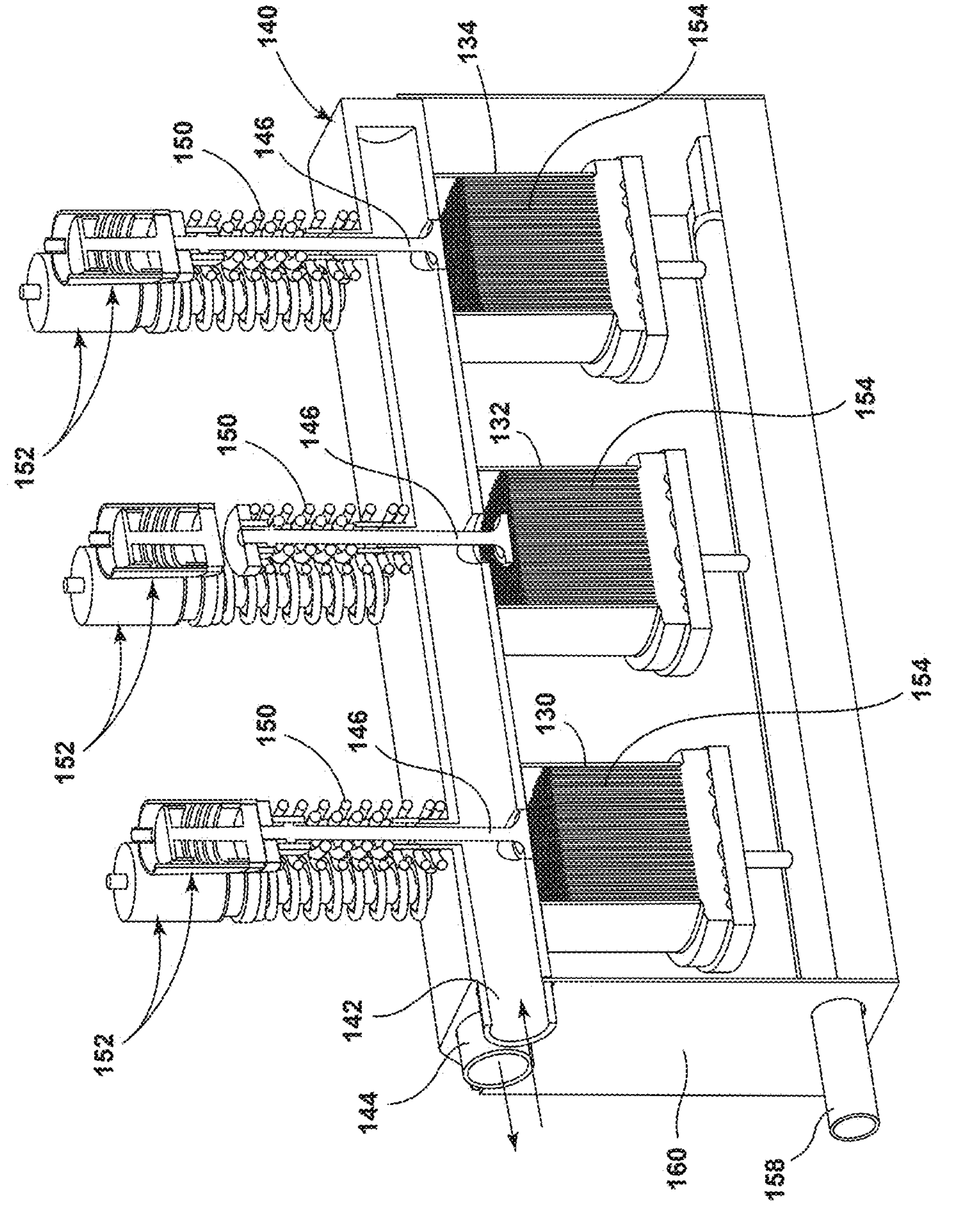
FIG. 8 is a first cross-section view of the cryogenic manifold of FIG. 7 illustrating dedicated feed valves for each cryopump.
Figure 9:
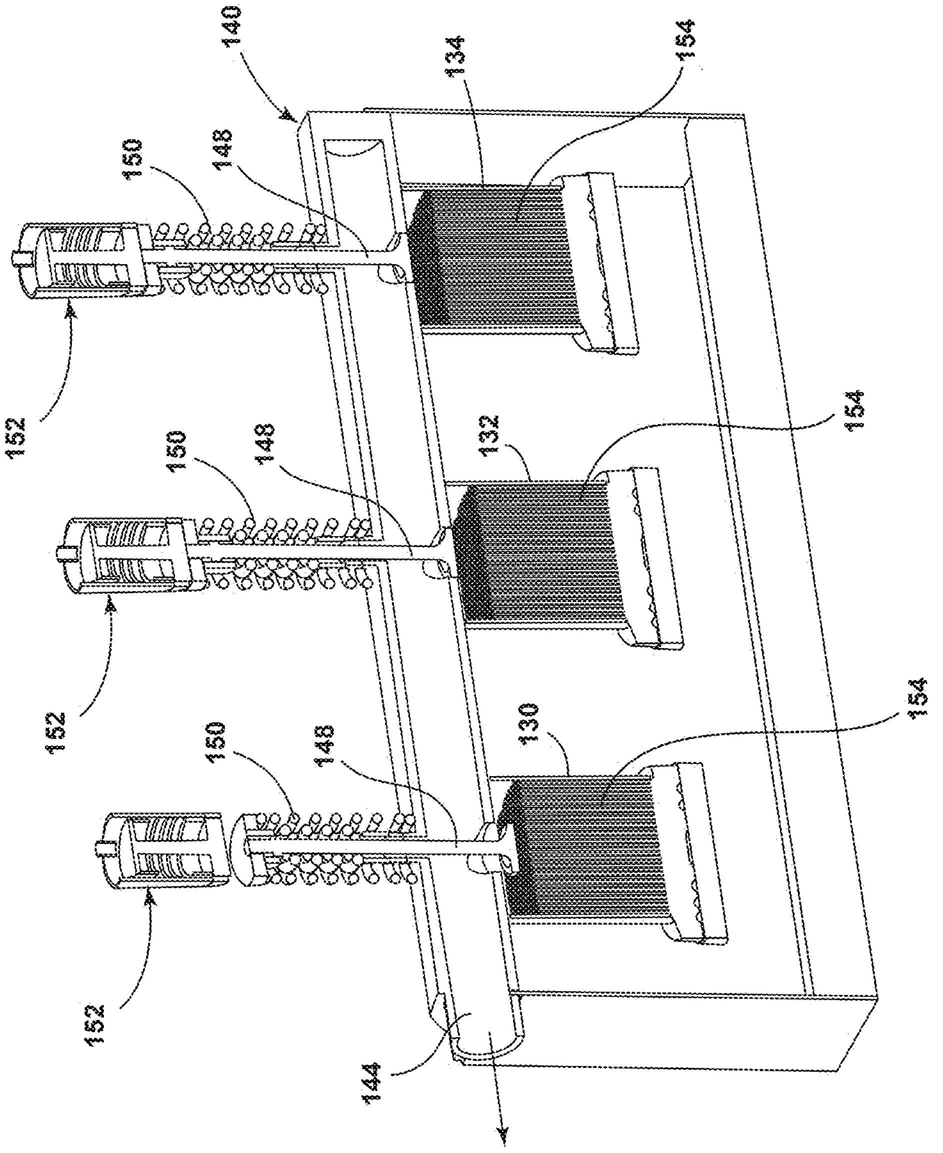
FIG. 9 is a second cross-section view of the cryogenic manifold of FIG. 7 illustrating dedicated return valves for each cryopump.

Referring now to FIGS. 7-9, the cryopumps 130, 132, 134 are illustrated as sharing a common manifold 140 for incoming and outgoing D-T fuel gases. The manifold 140 includes a feed channel 142 and a return channel 144 in fluid communication with each cryopump. The manifold 140 also includes two valves for each cryopump: a feed valve 146 and a return valve 148. The feed valve 146 selectively couples the corresponding cryopump to the dump chamber 124 via the feed channel 142. The return valve 148 selectively couples the corresponding cryopump to the return line 138 via the return channel 144. Each feed valve 146 and each return valve 148 are biased in the closed position by a coil spring 150. In addition, each feed valve 146 and each return valve 148 are coupled to a dedicated pneumatic actuator 152. Other embodiments include solenoid actuators or linear actuators by non-limiting example. Each cryopump 130, 132, 134 defines a cylindrical chamber with a copper mesh 154 contained therein. The copper mesh 154 is thermally coupled to a coolant supply line 156 and a coolant return line 158 for cooling each cryopump after regeneration is complete. The manifold 140 also includes a thermal radiation shield 160 and a heat sink 162.

Further by example, FIGS. 8-9 illustrates the first cryopump 130 as releasing fuel gases to the return channel 144. Simultaneously, the second cryopump 132 is depicted as receiving fuel gases from the dump chamber 124, while being closed off to the return channel 144 for sublimation. The third cryopump 134 is depicted as being closed off to the feed channel 142 and the return channel 144 during regeneration. The illustrated embodiment includes a common manifold for both the incoming and outgoing D-T fuel gases, thermally anchored to a copper radiation shield operating at approximately 40 K. While illustrated as having three cryopumps, the pellet fueling apparatus 100 can have greater or fewer cryopumps in other embodiments, including as few as a single cryopump and greater than six cryopumps.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A cryogenic extrusion recirculation system comprising:

a cryogenically-cooled extruder configured to form a solid deuterium-tritium (D-T) ribbon and discharge the solid D-T ribbon through an extruder nozzle;

a pellet cutter configured to separate the solid D-T ribbon into a plurality of D-T pellets for output to a pellet gun barrel;

a cryogenically-cooled augur that is positioned to receive excess solid extrusion from the pellet cutter;

a restrictive section disposed downstream of the cryogenically-cooled augur, the restrictive section being configured to receive the excess solid extrusion from the cryogenically-cooled augur as a solid fuel plug;

a heater section positioned downstream of the restrictive section and configured to heat a leading portion of the solid fuel plug and thereby convert the leading portion of the solid fuel plug into a gaseous phase; and wherein the gaseous phase is recirculated to the cryogenically-cooled extruder for continuous D-T pellet formation.

2. The system of claim 1, wherein the heater section comprises at least one of a resistive heating element, an inductive heater, or a laser heat source.

3. The system of claim 1, wherein the heater section is configured to control heating of the solid fuel plug such that the recirculated gaseous phase includes a pressure that matches an inlet pressure of the cryogenically-cooled extruder.

4. The system of claim 1, wherein the gaseous phase is heated to between 20 K and 80 K by the heater section.

5. The system of claim 1, wherein the restriction section is disposed between the cryogenically-cooled auger and the heater section.

6. The system of claim 1, wherein the gaseous phase is introduced into a supply line downstream of a pre-cooler and upstream of the cryogenically-cooled extruder.

7. The system of claim 1, wherein the cryogenically-cooled augur conveys excess solid extrusion perpendicularly away from the extruder nozzle.

8. The system of claim 1, wherein the restrictive section is disposed along an axis that is substantially perpendicular to an extrusion axis of the extruder nozzle.

9. The system of claim 1, wherein the cryogenically-cooled auger is magnetically coupled to a motor disposed outside of a cryostat housing.

10. The system of claim 1, wherein the cryogenically-cooled extruder includes a cryogenic jacket extending around an extruder barrel.

* * * * *